Jan. 31, 1950     E. C. SMITH     2,495,947
NUT RAKE
Filed Jan. 21, 1947
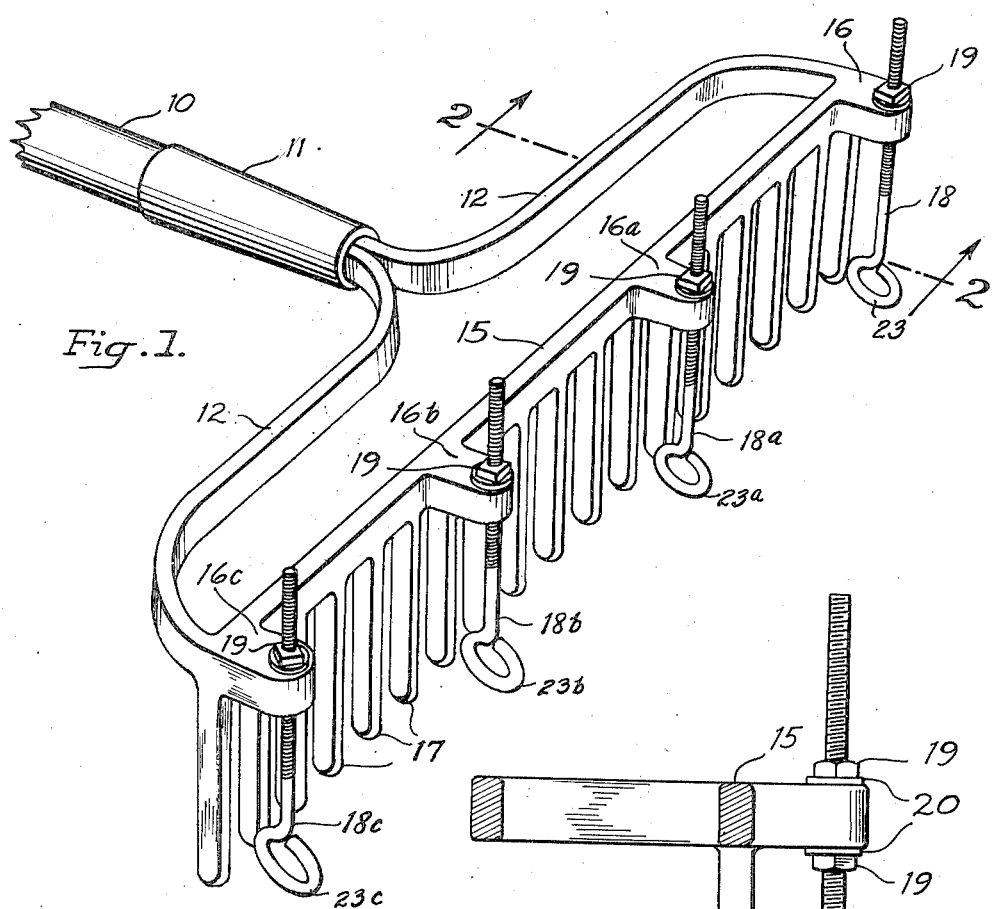
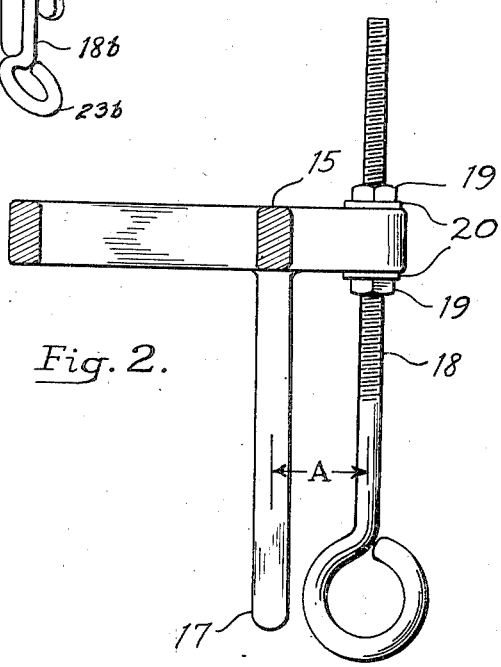
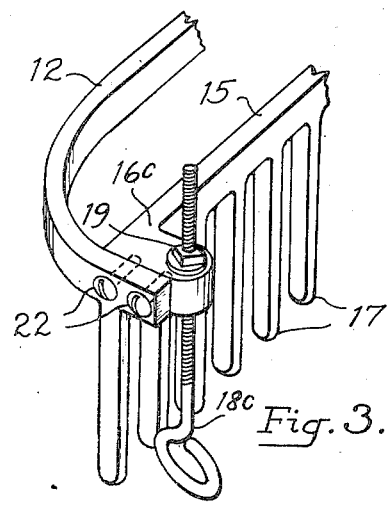
INVENTOR.
Edward C. Smith
BY
Atty.

Patented Jan. 31, 1950

2,495,947

UNITED STATES PATENT OFFICE 2,495,947

NUT RAKE

Edward C. Smith, Aurora, Oreg.

Application January 21, 1947, Serial No. 723,341

7 Claims. (Cl. 56—400.04)

This invention relates to nut rakes and more particularly pertains to rakes for use in harvesting nuts which have fallen to the ground from trees on which they have grown.

It is current practice, even in commercially operated orchards, to gather by hand walnuts, pecans, filberts, and other species of nuts after they have ripened on the tree and have fallen to the ground. Such practice obviously is time-consuming and the labor required adds materially to the cost of the crop. It therefore would be of great economic value to have available an implement such as a rake which may be used to expedite the harvesting of nuts by eliminating to a substantial degree the slow and laborious process of gathering them by hand.

Rakes of ordinary types such as have been designed and built for raking clean a given area of grass, grain, leaves or debris are not adapted, however, to raking up nuts from the ground. As they drop from the tree, the nuts fall into and become commingled with extraneous matter such as leaves, sticks, grass and the like. Rakes of the types known to the prior art which clear the ground of superimposed materials patently will gather up the extraneous matter together with the nuts if it is attempted to use them for purposes of nut gathering. A rake is required, therefore, which will sort out nuts from leaves, grass, sticks and like materials and which will gather the nuts selectively, leaving behind the other materials. It is the essence of the present invention that such a function may be imparted to a rake by proper control and design of the shape and manner of disposition of the teeth and by providing, at a spaced interval from the teeth, support members by means of which the teeth may be kept a controlled and predetermined distance from the ground.

It is therefore the general object of the invention to provide a rake which, when drawn across the surface of the ground beneath a nut tree, will sort out and gather selectively the nuts from the accumulation of leaves, sticks, grass and other extraneous substances into which the nuts may have fallen and with which they are commingled.

Another object is the provision of a rake which is versatile and which is applicable to the harvesting of nuts of diverse species and sizes.

A further object is to provide a rake having teeth at a controlled and predetermined distance from the ground so that when the rake is used for gathering nuts on rough and uneven terrain, the teeth of the rake will not dig into elevations or skip over depressions in the ground.

Still another object is the provision of a nut rake which may be used effectively close to the trunks of trees and other obstacles.

Another object is to provide a rake adapted for use as an attachment to a tractor or other vehicle in the harvesting of nuts on a large scale in commercially operated orchards.

A further object is the provision of a nut rake of light, strong and balanced construction.

The manner in which the foregoing and other objects of the invention are accomplished will be apparent from a consideration of the following description and claims, taken together with the accompanying drawings wherein like numerals indicate like parts and wherein:

Figure 1 is a perspective view of a nut rake embodying the features of the invention;

Figure 2 is an elevation, partly in section, enlarged view taken along the line 2—2 of Figure 1; and Figure 3 is a broken perspective view illustrating a modified form of rake wherein the rake bar is detachable from the rake head.

In the drawing, the handle of a rake is indicated by the numeral 10. Attached to the handle through the cuff 11 is a rake head comprising the arms or bracket bars 12, 12 and the elongated member or rake bar 15. Although the bracket and rake bars may be of varying dimensions, the rake bar preferably is of greater depth than width as where it has, for example, a depth which is approximately twice its width.

Extending laterally from the rake bar and spaced at suitable intervals are the projections or lugs, 16, 16a, 16b, 16c. These preferably are formed integrally with the rake bar and may extend outwardly therefrom a distance of from about three-quarters inch to about one and three-quarter inches.

Extending downwardly from the rake bar in a direction which is substantially perpendicular to the plane of the rake head are a plurality of teeth or tines, one of which is indicated at 17. The teeth, like the lugs, preferably are formed integrally with the rake bar and may be of varying lengths and sizes. They are, however, of uniform size, are substantially straight, i. e. not curved, and have no taper. The ends are blunt or slightly rounded in order to prevent their piercing and collecting leaves and other materials.

The spacing of the teeth along the rake bar may be varied to suit the needs of a particular nut-gathering operation. Where the rake is to be used for harvesting nuts of relatively small diameters, the teeth will be spaced more closely together than when it is to be used for gathering comparatively large nuts. It has been found, however, that when the distance between adjacent surfaces of the teeth is about nine-sixteenths inch, the rake is adapted for use in gathering almost any of the varieties of nuts which are of commercial significance.

Attached to the projections 16, 16a, 16b, 16c are the support members or legs 18, 18a, 18b, 18c. These serve the function of supporting the teeth of the rake a controlled and predetermined distance from the ground, and prevent the teeth from digging into the ground when the rake is drawn over an uneven surface. The frequency with which the support members are disposed along the rake bar is such that the teeth are supported uniformly even when the rake passes over depressions. This makes desirable the spacing of the legs at relatively frequent intervals, e. g. intervals of about 6 inches, which will correspond to the spacing of the projections on the rake bar to which the legs are attached.

It is to be noted that the projections on the rake bar extend laterally from the bar. Hence the support members are positioned either forwardly or rearwardly, preferably forwardly, of the teeth, and not outwardly from either end of the rake. This factor is of significance when the rake is to be used close to the trunks of trees, stones and other obstacles, since it enables close approach of the teeth of the rake to the obstacles. As a result, any nuts lying adjacent thereto will be collected.

The support members are provided at their lower extremities with skid portions adapted to contact the ground and to slide thereover with a minimum of resistance and without digging in. The skid members may assume various forms, such as where shoes or loops are used, provided they are so designed as to offer a relatively broad and somewhat curved surface to the area over which the rake is drawn. Ordinary eye-bolts of suitable size conveniently may be employed as support members, in which case the eye portions 23, 23a, 23b and 23c of the bolts are positioned so that they comprise the lower extremities of the supports and serve as skids which slip over the ground.

The support members preferably are so mounted on the rake head as to be capable of vertical adjustment, so that the distance at which the teeth of the rake are supported from the ground may be varied as desirable or necessary. It is desirable, for example, to have the teeth closer to the ground when the rake is applied to the gathering of nuts of small diameters, than when it is used to harvest nuts of relatively large cross section. Although various means may be employed for adjustably mounting the support members on the rake head, a convenient and preferred means comprises providing perforations in the projections extending outwardly from the rake bar and extending through these perforations threaded portions of the shanks of the support members. The latter may then be held in position by means of lock nuts, indicated at 19, with washers, indicated at 20, disposed on either side of the projections and screwed into engagement therewith. Changes in the vertical position of the support members with respect to the teeth may then be effected by suitable adjustment of the lock nuts.

The distance at which the support members are located outwardly from the rake bar is of significance in determining the success of the rake as a selective, nut-gathering implement. When the rake is in use and the handle is raised and lowered with respect to the ground, the rake head will pivot about the skid portions, or lower extremities, of the support members. This will cause the gap between the ends of the teeth and the ground to vary. It will be apparent that relatively small variations in the space between the rake teeth and the ground will have a material effect on the operation of the rake. If this space is increased beyond a certain critical limit, determined by the diameters of the nuts being gathered, the result will be that the rake will pass over and miss the objects it is desired to collect. If, on the other hand, the space is reduced too materially, the rake will pick up leaves, grass and other debris and will not act selectively in sorting out the nuts therefrom.

To control, therefore, the distance between the rake teeth and the ground and to insure that this distance will not vary too greatly as the rake is used, the support members are positioned outwardly from the teeth of the rake at a minimum distance, center to center, of about one-half inch and a maximum distance of about one and one-half inches. This spacing is indicated by the distance A of Figure 2. A preferred distance, which enables the substantially universal application of the rake to almost any species of nut, is about three-quarters inch.

Thus, by controlling the distance between the teeth of the rake and by supporting the teeth a controlled and predetermined distance from the surface of the ground, it is possible to impart to a rake the ability to gather selectively nuts from refuse material, the nuts being retained between the teeth of the rake, and the leaves, grass, sticks, etc. passing between the teeth or slipping thereunder. As a result, it is possible to harvest nuts at a rate which is at least six times that attainable by the orthodox methods of hand picking. The rate of harvest may be increased still further by extending the length of the rake head, with teeth and supporting members attached at spaced intervals, to any practical length and attaching it as a side arm to a tractor or other vehicle. When thus designed and powered, it may rapidly be propelled over the ground to cover a large area in a relatively short time.

The versatility of the rake may further be enhanced by constructing it in such a manner that the rake is not made integrally with the supporting arms but is a separate member attached to the arms by means such as bolts, clamps and the like. This modification is illustrated in Figure 3, wherein the attaching means are the bolts 22, 22 extending through the rake head and engaging the rake bar. There thus may be supplied with any given rake assembly a plurality of rake bars having different spacings between the teeth or between the teeth and the support members so that the operator may select and attach to the arms a bar on which the spacing is appropriate to the harvesting of a particular variety of nut. Having the rake bar detachable from the supporting arms makes the implement further versatile in that with such an arrangement it is possible to reverse the position of the rake bar with respect to the arms so that the support members may be positioned either forwardly or rearwardly of the teeth of the rake, as desirable or necessary in a given case.

Having now described my invention, what I claim as new and desire to protect by Letters Patent is:

1. A nut rake for selectively separating nuts from leaves and other refuse material on the ground which comprises a handle, a rake head, means interconnecting the handle and the rake head, a plurality of projections on the rake head extending in a direction away from the handle, and a plurality of support means attached one to each of the projections and extending substantially parallel to the teeth and terminating in ground engaging skid members adjacent to but spaced apart from the teeth.

2. A nut rake for selectively separating nuts from leaves and other refuse material on the ground which comprises a handle, a rake head, means interconnecting the handle and the rake head, a plurality of projections on the rake head extending in a direction away from the handle, and a plurality of support means attached one to each of the projections and extending substantially parallel to the teeth and terminating in integrally formed ground engaging loops adjacent to but spaced from the teeth.

3. A nut rake for selectively separating nuts from leaves and other refuse material on the ground which comprises a handle, a rake head, means interconnecting the handle and the rake head, a plurality of projections on the rake head extending in a direction away from the handle, a plurality of support means attached one to each of the projections and extending substantially parallel to the teeth and terminating in ground engaging skid members adjacent to but spaced apart from the teeth, and means for securing the vertical adjustment of the support means, whereby to control the spacing of the teeth from the ground.

4. A nut rake for selectively separating nuts from leaves and other refuse material on the ground which comprises a handle, a rake head, means for removably attaching the rake head to the handle, a plurality of projections on the rake head extending in a direction away from the handle, and a plurality of support means attached one to each of the projections and extending substantially parallel to the teeth and terminating in ground engaging skid members adjacent to but spaced apart from the teeth.

5. A nut rake for selectively separating nuts from leaves and other refuse material on the ground which comprises a handle, a rake head, a pair of perforated arms for interconnecting the rake head with the handle, screws for penetrating the perforations in the arms and extending into the rake head, thereby removably attaching the rake head to the arms, a plurality of projections on the rake head extending away from the handle, and a plurality of support means attached one to each of the projections and extending substantially parallel to the teeth and terminating in ground engaging skid members adjacent to but spaced apart from the teeth.

6. A nut rake for selectively separating nuts from leaves and other refuse material on the ground which comprises a handle, a rake head, means for removably attaching the rake head to the handle, a plurality of projections on the rake head extending in a direction away from the handle, support means attached one to each of the projections and extending substantially parallel to the teeth of the rake and terminating in skid members adjacent to but spaced from the teeth, and means for adjusting the support members vertically, whereby to control the spacing of the teeth from the ground.

7. A nut rake for selectively separating nuts from leaves and other refuse material on the ground which comprises a handle, a rake head, means interconnecting the handle and the rake head, a plurality of projections on the rake head extending laterally in a direction away from the handle, and a plurality of support means attached one to each of the projections and extending substantially parallel to the teeth and terminating in ground engaging skid members adjacent to but spaced apart from the teeth.

EDWARD C. SMITH.

REFERENCES CITED

The following references are of record in the file of this patent:

UNITED STATES PATENTS

| Number | Name | Date |
|---|---|---|
| 293,210 | Dennen et al. | Feb. 5, 1884 |
| 1,435,492 | Pantiga | Nov. 14, 1922 |
| 1,481,379 | Lennon | Jan. 22, 1924 |
| 2,137,608 | Flavin | Nov. 22, 1938 |